Jan. 5, 1960   J. H. FRIDEN   2,919,462
METHOD OF AND APPARATUS FOR MAKING PLASTIC CONTAINERS
Filed March 15, 1954   6 Sheets-Sheet 1

United States Patent Office 2,919,462
Patented Jan. 5, 1960

2,919,462

METHOD OF AND APPARATUS FOR MAKING PLASTIC CONTAINERS

John H. Friden, Maplewood, N.J., assignor, by mesne assignments, to American Can Company, New York, N.Y., a corporation of New Jersey Application March 15, 1954, Serial No. 416,126

8 Claims. (Cl. 18—5)

This invention relates to the production of containers, such as collapsible tubes, squeeze bottles and the like, from plastic materials. It is particularly concerned with the production of containers from thermoplastic materials, such as polyvinylidene chloride, which are normally of crystalline character or which exhibit substantial increase in tensile strength upon working of the same. Such increase in strength may, for example, be brought about by appropriate orientation of the crystal structure.

An important object of the invention has been to provide a plastic container of the character indicated which has a relatively thin wall, rendering the same readily collapsible, and which will withstand the hard usage to which collapsible tubes are ordinarily subjected and will prevent the transmission through the tube wall of the volatile oils commonly provided in toothpastes and the like. Toward these ends the invention provides a tube formed of a normally crystalline, plastic material, such as polymerized vinylidene chloride, which has been worked substantially, both longitudinally and transversely, to impart increased strength, due to orientation or the like, and which is of desirably uniform wall thickness.

Prior efforts to produce collapsible tubes for the packaging of toothpaste and the like from plastic materials have been unsuccessful due to one or more deficiencies, such as weaknesses in the structure of the tubes, excessive variation in the thickness of the tube walls, and the inability of the tubes to prevent the loss of volatile oils from the packaged materials.

A further important object of the invention, therefore, has been to provide a reliable and efficient method and apparatus by which containers of the character indicated may be produced. In accordance with the invention a section of tubing formed by the extrusion of a normally crystalline plastic material is extended lengthwise and expanded circumferentially to produce a container of the desired form and dimensions. The completed container is substantially longer and of substantially greater diameter than the section of extruded tubing from which it is produced. This brings about a number of important advantages. For example, when a crystalline type of plastic material of the character above mentioned is employed, the strength of the wall of the container is greatly increased as compared with one formed simply by expanding the original tubing circumferentially in producing the desired dimensions of the container. Moreover the combined lengthwise and circumferential stretching or expansion of the original tubing enables the provision of a relatively thin wall for the main body of the container while at the same time providing a relatively thick and rigid shoulder merging into a neck at the top of the container which may be formed with screw threads or the like to retain a closure cap. Greater uniformity of wall thickness is also provided.

An important feature of the invention involves subjecting the original tubing to a rapid mechanical stretching operation to provide the desired length or height of the final container, with some excess length in the case of collapsible tubes to permit trimming off of the end opposite to the neck end. After such mechanical lengthwise rapid stretching of a section of tubing, the latter is expanded by a suitable fluid, such as air, introduced into it under appropriate pressure. Hereinafter the fluid will be referred to as air but it will be understood that the fluid may be some other gas or a suitable liquid. If desired, the expanding operation may be commenced prior to completion of the stretching operation, but preferably it is not commenced until after the stretching has been completed, or substantially so.

It has been found that, in dealing with crystalline plastics of the character mentioned, the sudden stretching of the tube section followed by the blowing operation produces substantially greater uniformity in the final container than is obtainable in other ways. For example, if a section of tubing having the length of the desired container is simply expanded circumferentially, the wall of the resulting container has been found to vary in thickness at different points to a much greater extent than a section of tubing which has been stretched and then expanded circumferentially. The maximum wall thickness of the expanded but unstretched tube has been found to be as much as, or even higher than, 100% greater than the minimum wall thickness of the tube. These wide variations often occur in adjacent regions of the tube wall. On the other hand a tube formed by successively stretching and then expanding a section of tubing has been found to have a maximum wall thickness which is not more than about 50% greater than the minimum wall thickness.

So also it has been found that tubes or containers formed from a short section of tubing by expanding the same both lengthwise and circumferentially, through the introduction of air under pressure into the tubing while unsupported over its major area but confined within a mold which is longer and of greater diameter than the section of tubing, vary quite substantially in wall thickness from one end to the other. This is believed to be due, at least in part, to the fact that the section of tubing tends to expand firstly in a circumferential direction and then lengthwise. Accordingly the lengthwise stretching takes place when there is substantial friction between the wall of the tube and the confining mold, with the result that the portion of the tube farthest removed from the neck portion, through which the air is introduced, is stretched to a much greater extent and is therefore much thinner than that portion near the neck. This great variation in thickness between the two ends of the tube wall is overcome by the present invention.

One possible explanation for the greater uniformity of wall thickness, even in adjacent regions of the tube wall, obtained by first mechanically stretching and then blowing the section of extruded tubing is that the mechanical strecthing serves to work the material and bring about orientation of its structure. It is suggested as a possible theory that the extent of orientation and severity of working is probably greater in those areas of the tube wall which are relatively thin or weak as the tube is extruded. Such increased orientation and working may well add sufficient strength to the originally thin or weak spots to make the stretched tube more uniform in strength throughout its area.

An important advantage derived from the mechanical stretching of a section of plastic tubing, followed by blowing the stretched section outwardly into conformity with the mold, is that it makes possible the establishment of a desired relationship between the thickness of the main wall of the final tube or container and the thickness of the annular portion forming the neck. The novel relationship is such that the volume of the plastic material in an annular section of given axial length taken from the main body of the container is substantially less than the volume of material in an annular section of equal length taken from the neck of the container. This relationship may also be expressed as follows: the difference between the squares of the outside diameter and inside diameter of the tube body is substantially less than the difference between the squares of the outside and inside diameters of the neck portion of the tube or container. By virtue of this relationship the container may be provided with a neck portion which is sufficiently thick-walled to have the desired stiffness and to enable the formation of a screw thread therein to retain a closure cap, without putting an excessive amount of plastic material into the main body of the container. This not only avoids wastage of material but insures the provision of a wall thickness in the main body of the container which is best suited for its intended purposes.

In the production of containers in accordance with the invention, a sectional mold is employed, this being divided longitudinally. The two sections may be separated to permit the introduction of a section of tubing and to permit the jaws of a longitudinally movable clamping member to be opened to receive the inner end of the tube and then to be closed to grip firmly and seal such end of the tube. The jaws of the clamping member may be heated, if desired, to insure the production of an effective seal. Subsequently the mold sections may be brought together and screw thread formations at one thereof may grip the outer end of the tube section. A tapered nozzle may now be inserted into the outer end of the tube section and, upon its inward movement, may serve to squeeze the material into the screw threads of the mold to more firmly grip the tube section. Pneumatic or other means may then be operated to cause the clamping member to stretch the tube section within the mold. When this has been done, air under suitable pressure may be blown into the stretched tube section and the latter expanded into conformity with the mold cavity. The mold is preferably formed of metal and appropriately heated. After the tube has been blown and allowed to set within the mold, the latter may be opened and the container removed for such subsequent treatment as may be desired. The same procedure may then be repeated to form another container. If desired a plurality of molds and related devices may be provided on a carrier or table and the same series of operations may be carried out in relation to each, to provide for continuous production of containers at a suitable rate.

For purposes of observation, a sectional mold formed of clear Lucite has been employed in accordance with the foregoing procedure. It has been observed that after the tube has been stretched and air under pressure is introduced to expand it, the expansion begins adjacent both ends and works quickly toward the mid-portion of the tube. On the other hand an unstretched tube within the mold, and of the full length of the mold cavity, when subjected to expansion by air has been found to expand firstly at the end remote from the neck end through which the fluid was introduced, and the expansion then progressed toward the end at which the nozzle is inserted. This less uniform expansion of the tube may account for the greater variation in wall thickness of the blown container. A section of tubing shorter than the mold cavity sealed at its inner end and caused to stretch by air pressure, both longitudinally and transversely, has been found to expand transversely first into engagement with the mold wall and then longitudinally along the wall. This has resulted in extreme thinning of the tube wall toward the sealed inner end.

As explained above the invention is particularly useful in the production of containers from a crystalline form of plastic material such as polyvinylidene chloride or copolymer of this with other thermoplastic substances. Some of the above discussed advantages are derived from the use of the method and apparatus of the invention in the formation of tubes or containers from sections of tubing formed of other plastics, such as polyethylene, but certain special advantages are obtained when the invention is employed in connection with normally crystalline forms of plastic material. The invention will therefore be explained in greater detail hereinafter in relation to the production of collapsible tubes from such plastic materials sold under the trade name "Saran." As explained in the patent to Harder, No. 2,344,511, granted March 21, 1944, such material undergoes certain changes in characteristics under various conditions of temperature, working and the like. At an appropriate softening temperature it is amorphous and may be extruded in the form of tubing. This tubing should then be promptly chilled to bring the temperature quickly down to a point somewhat below room temperature so that crystallization is substantially arrested. If the tubing is to be stored away for a substantial period of time before processing, it should be chilled to a relatively low temperature, i.e. 10° C. or even lower. This will not stop crystallization completely, but will retard it substantially. However, if it is to be processed immediately it need not be chilled below about normal room temperature, i.e. about 20° C., since crystallization takes place relatively slowly at such a temperature.

When it is desired to form a container from the tubing by stretching and expanding it, a section of tubing of suitable length at a temperature between about 10° C. and 30° C. is inserted in a mold, which is preferably heated to between about 50° C. and 90° C., and is then subjected to stretching to about 2 to 3 times its original length and then to circumferential expansion, to about 2.5 to 3 times its original outside circumferenc, by the introduction of air under a gauge pressure of from about 25 to 150 lbs. per sq. in. The stretching and subsequent expansion should be carried out in relatively rapid succession and, as indicated above, the expansion may be commenced, if desired, before the stretching operation has been fully completed. The resulting working of the material apparently serves to speed up considerably the crystallization of the material, as compared with the rate at which this proceeds without working at the temperature employed. However, at a temperature within the range indicated the crystallization appears to proceed at a quite rapid rate even without working. As a result of the stretching and subsequent expansion, a double orientation takes place, i.e. lengthwise and in a transverse direction, so that a substantial increase in tensile strength is produced.

A container formed in accordance with the foregoing from polyvinylidene chloride, or from a copolymer of this with other thermoplastic substances, has been found to have very desirable properties for the packaging of preparations containing essential oils. Thus tooth pastes containing such oils may be satisfactorily packaged in a collapsible tube having a relatively thin wall in its main body, averaging say, about .0085 of an inch, and a collapsible tube having an outside diameter of about one inch in its main body portion and having such wall thickness in its body portion can be made by the present invention from plastic tubing having a wall thickness of about .05 to about .065 of an inch and having an outside diameter of about .400 of an inch. With the relatively small variation made possible by the invention and the strength imparted to the plastic material through the double orientation of its crystalline structure, such a container will resist rupture under internal pressures for exceeding 50 lbs. per square inch in the course of normal handling and use. Also, it is resistant to the passage of essential oils. The neck is sufficiently stiff to retain a screw threaded cap and to permit its easy application and removal.

With the foregoing and other objects, features and advantages of the invention in view, certain embodiments of the same will now be described in greater detail by reference to the accompanying drawings, in which.

Figure 1:
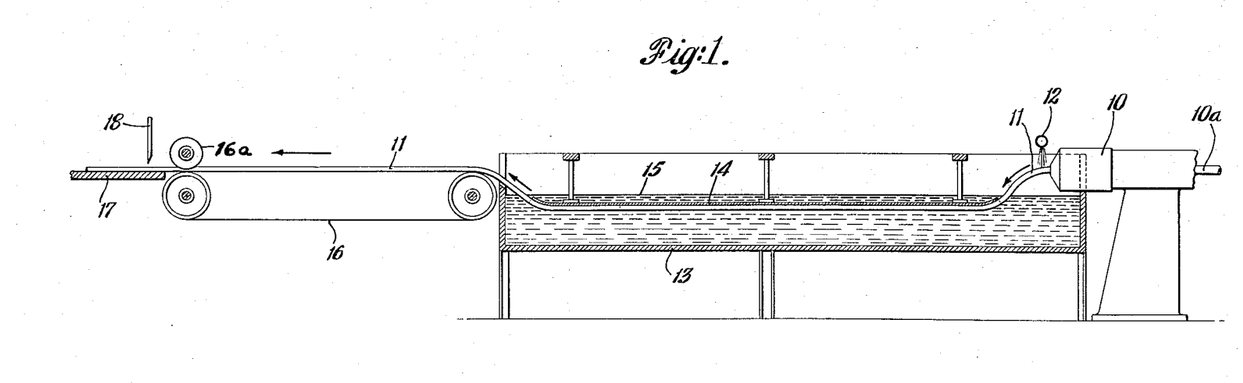
Fig. 1 is a schematic view, in elevation, of the apparatus for forming tubing by extrusion in accordance with the invention.

Turning now to Fig. 1, a thermoplastic material, of which containers are to be formed in accordance with the invention, is arranged to be extruded through a nozzle 10. It will be understood that the material, originally in a comminuted form, is introduced into the extruding equipment and is therein subjected to heating to a sufficient temperature and for a sufficient period of time to effect softening of the same to render the material readily extrudable. In dealing with polymerized vinylidene chloride or copolymers of vinylidene chloride with other plastics such as vinyl acetate, vinyl chloride, styrene, and the like, which develop a crystalline structure upon standing for a period of time at or above normal room temperatures, it is desirable to heat the same in the extruding apparatus to a temperature somewhat above the softening point, but below the temperature at which decomposition occurs. Upon such treatment there is provided a mass of material in the amorphous state which may readily be extruded through the nozzle 10. The latter is provided with an annular orifice so that tubing 11 is discharged from the nozzle. In order to prevent the collapse of the tube wall it is desirable to introduce air or other gaseous medium into the interior of the tubing under very low pressure. This pressure should not be sufficient to bring about any appreciable expansion of the tubing, but merely sufficient to prevent its collapse. It has been found that a gauge pressure between about .01 and .10 lb. per sq. in. is sufficient for the purpose.

Figure 2:
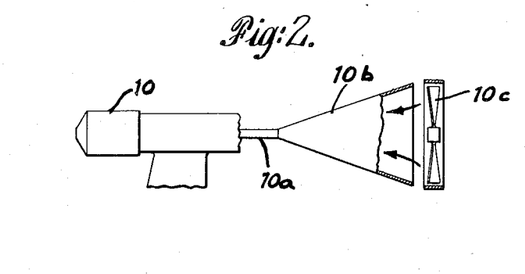
Fig. 2 is a detail view, in elevation, illustrating an arrangement for introducing air under slight superatmospheric pressure into the interior of the extruded tubing.

It has been found that the desired air pressure may be created within the tubing, without danger of building up excessive pressure, by the use of a fan arrangement, as shown in Fig. 2. This involves the attachment of a funnel member 10b to a tube 10a which is arranged to deliver air to the interior of the annular orifice of the extruder through which the plastic tubing is extruded. A fan 10c positioned adjacent, but spaced slightly from the mouth of the funnel, serves to deliver air to the tube 10a under the desired low pressure. This is just sufficient to prevent collapse of the plastic tubing, without danger of any appreciable expansion of the same. As soon as the tubing emerges from the nozzle it is subjected to the chilling action of a spray of cold water discharged from a nozzle 12. The water so discharged is preferably at a temperature of about 5° C. or lower. In fact, a temperature close to 0° C. is desirable, and a suitable freezing point depressant, such as salt, may be included in the water to enable attainment of the desired temperature without danger of freezing the water. The tubing is then carried downwardly into a tank 13 containing cold water at a temperature of about 40° F. or lower. Cooling of the water for this purpose may be effected in any suitable way. The water discharged from the spray nozzle 12 may be collected by the tank and the excess, above a predetermined level, permitted to overflow. Nozzle 12 should be so arranged that the water spray will strike the extruded tubing immediately as it emerges from the nozzle 10. Also, the extruded tubing should be led quickly down into the tank beneath the level of the cooling water therein. Within the tank the extruded tubing is carried along a guide channel provided in an elongated, downwardly concave member 14 suitably suspended in the tank. This guide member serves to hold the tubing, during the major portion of its travel through the tank, some distance below the upper surface of the water in the tank, which is indicated at 15. The tank should be of sufficient length to insure chilling of the tubing to a temperature somewhat below normal room temperature, i.e. to about 40° F. or lower, and this should be accomplished in a relatively brief period of time. As the tubing emerges from the tank it is led on to a conveyor 16 which may be of any suitable construction, and is driven at a suitable speed to advance the tubing toward a point for further treatment or disposition at about the rate at which it leaves the extruder.

Depending upon a variety of factors, the tubing delivered by the conveyor 16 may be handled in a number of different ways. It may, if desired, be delivered to a table 17 (Fig. 1) on which it is cut into sections by means of a cutter 18. If the tubing is to be subjected immediately to the stretching and expanding operations, for the formation of containers therefrom, the sections into which the tubing is cut on the table 17 may be of the length desired for introduction into the molds to be hereinafter described. However, ordinarily it will be found that the extruder is capable of operation at a faster rate than the apparatus for performing the subsequent operations thereon so that it becomes desirable to store the tubing and then remove it from storage whenever it can be subjected to the further operations. For this purpose the tubing may, if desired, be stored in relatively long, straight lengths, say 12 foot lengths, in which event the cutter 18 may be employed to sever it at the appropriate points to provide the desired lengths. Since it is important to maintain the temperature of the tubing at or somewhat below normal room temperature until it is to be subjected to the stretching and expanding operations, the sections of tubing cut in the manner indicated should be transferred for storage on suitable horizontal racks in a refrigerated room or space as promptly as possible. It may then be removed or fed out of the refrigerated storage space whenever it is required to supply the stretching and expanding equipment. If desired, the tubing may be cut, on the table 17, into short sections of the length suited for the stretching and expanding equipment, and these short lengths may be stored in trays in the refrigerated space until required.

In the handling of the tubing in the manner described above, care must be exercised not to permit any substantial pressure to build up within the tubing since pressures of more than a small fraction of a pound per sq. in. will have a tendency to expand the tubing, particularly at any weak spots, so that bubbles will be formed. Accordingly the means for supplying the desired low pressure within the tubing to prevent collapse of the same should preferably be of such character that the pressure will not build up in the event a portion of the tubing becomes partially or completely sealed. The fan arrangement of Fig. 2 is quite satisfactory for this purpose.

Whatever means may be provided for supplying air to the interior of the tubing, it is desirable to insure the maintenance of a substantially uniform pressure which is not subject to variation as the tube is severed into lengths. This may be accomplished by the provision of a roller 16a just in advance of the cutter 18. The roller cooperates with the conveyor 16 to squeeze the tubing together momentarily as the conveyor passes over the supporting roller or drum at the left end (Fig. 1). At this time the tubing has sufficient resilience to resume its circular contour as it passes beyond the roller 16a. Provision of this roller insures the maintenance of a constant length of tubing from the mouth of the extruder to the point at which the tubing is pinched together and thus insures the maintenance of the same pressure conditions within that length of tubing. Of course, the air supply means should be of such character as to introduce air at the desired rate, commensurate with the rate of extrusion, and at the desired low pressure. The air or other gaseous medium, prior to introduction into the tubing may advantageously be heated to accelerate the heating of the plastic material in the barrel of the extruder when a non-crystallizing form of plastic material is being extruded.

However, in dealing with material which tends to crystallize at or above room temperature it is desirable to chill the air or other gaseous medium, prior to introduction into the tubing, so as to prevent or minimize crystallization at the inner surface of the tubing. In this case the conduit through which the air is introduced should be insulated as well as possible from the extruder head.

Figure 3:
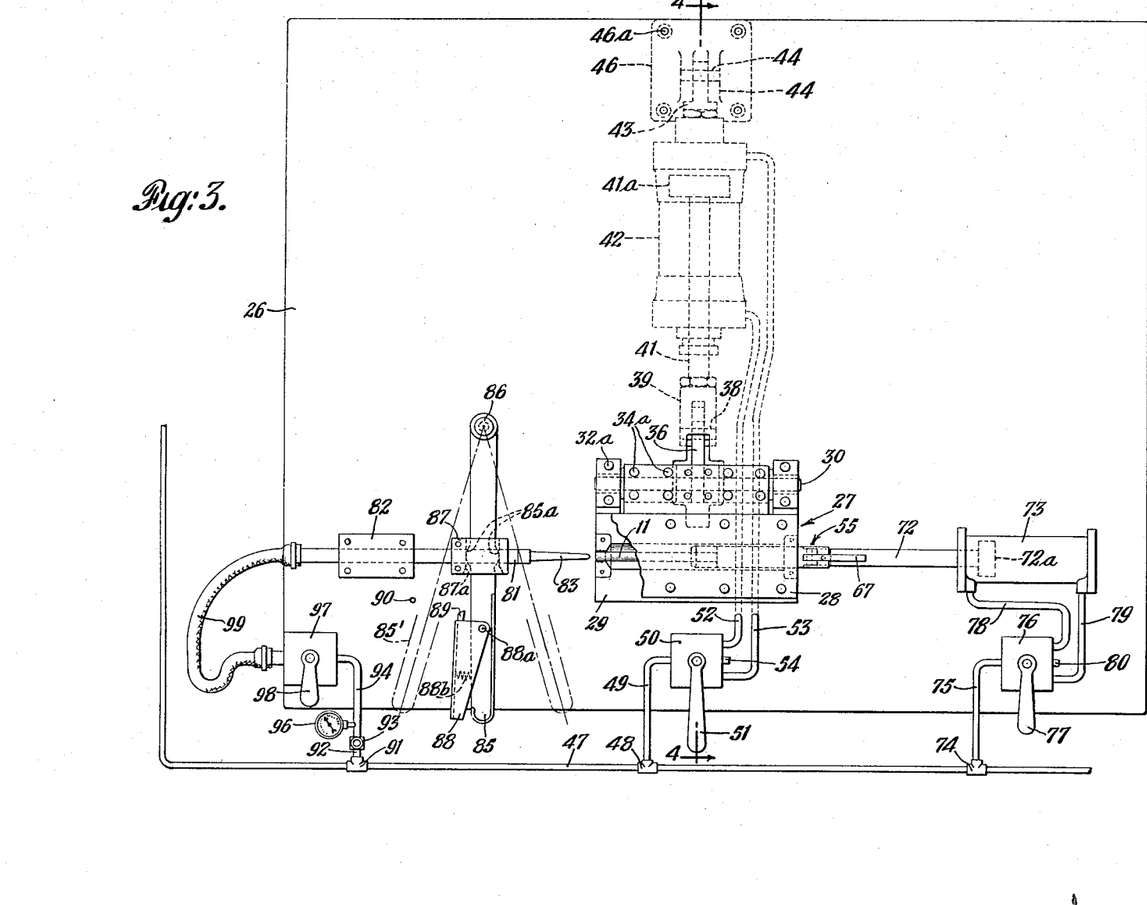
Fig. 3 is a plan view, largely schematic, of apparatus which may be employed for the stretching and expanding of sections of the extruded tubing.
Figure 4:
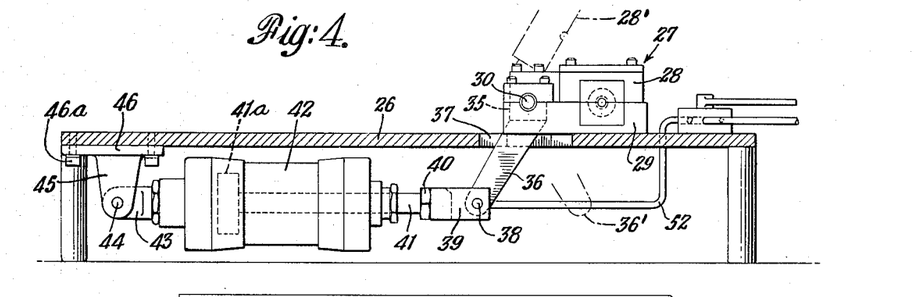
Fig. 4 is a vertical sectional view through the apparatus shown in Fig. 3, taken on the line 4—4 of Fig. 3, certain of the parts being shown in elevation.
Figure 5:
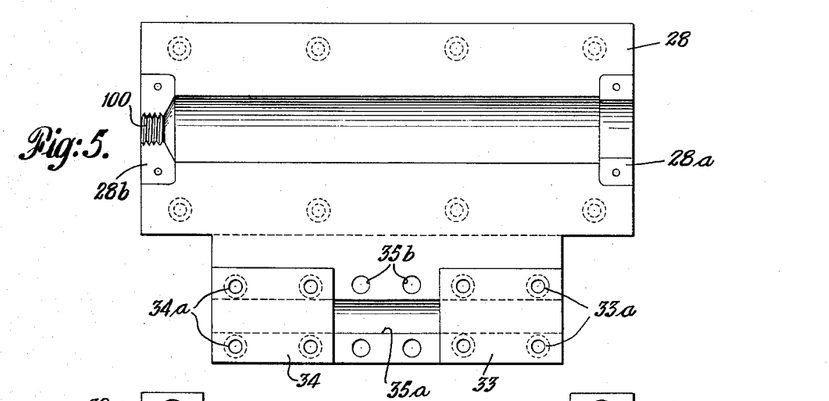
Fig. 5 is a plan view of the under face of the top member of a split mold employed in the apparatus.
Figure 6:
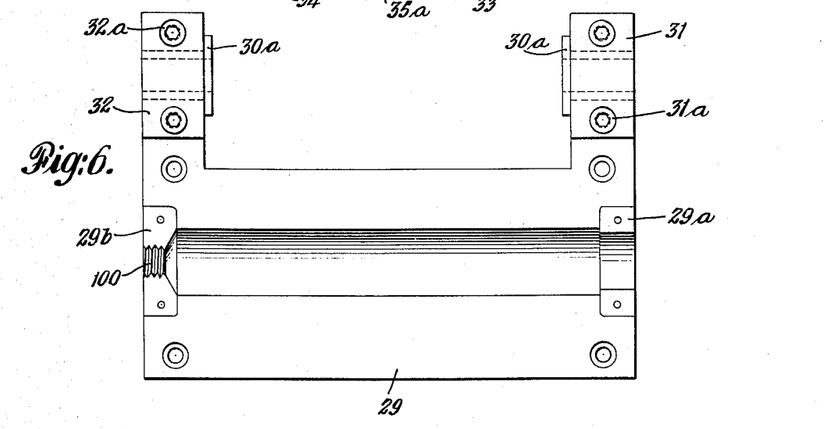
Fig. 6 is a plan view of the top face of the bottom member of the split mold.

In Fig. 3 there is illustrated suitable apparatus which may be employed for the purpose of stretching and then circumferentially expanding sections of the tubing extruded in the manner explained. This comprises a table 26 mounted on suitable supports and having secured to the upper surface thereof a portion of the mold designated generally as 27. This mold comprises a top half 28 and a bottom half 29 (Figs. 4, 5 and 6) which are pivotally interconnected by means of a rod or shaft 30. The bottom half 29 of the mold is provided adjacent its ends with semi-circular seats adapted to receive bushings 30a, formed of suitable material, for the shaft 30. A removable top section 31 of the bearing is secured to the bottom half of the mold by means of screws 31a. Similarly a top member 32 for the bearing at the opposite end of the shaft 30 is secured to the bottom half of the mold by means of screws 32a. Intermediate the two bearings carried by the bottom half of the mold, there is provided a pair of bearings 33 and 34 carried by the top half of the mold. These bearings are likewise split and removable sections forming half of each bearing are suitably secured to the top half of the mold. The separable section for bearing 33 may be secured by screws 33a and that for bearing 34 may be secured by screws 34a. Between the two bearings 33 and 34 there is mounted on the shaft a clamping member 35 (Fig. 4) having a semi-circular groove therein cooperating with the shaft 30. The top half of the mold is provided with a complementary semi-circular groove 35a (Fig. 5) to receive the opposite half of the shaft 30. Suitable means such as screws cooperating with openings 35b in the top section of the mold serve to secure the clamping member or plate 35 to the under face of the top half of the mold. Integral with, or otherwise secured to the member 35 is a downwardly and rearwardly extending arm 36 which passes downwardly through an opening 37 in the table 26. Beneath the table the arm 36 is connected by means of a pin 38 with a forked member 39 secured by a screw threaded nut-like portion 40 to the outer end of a piston rod 41 which carries a piston 41a within an air cylinder 42. The rearward end of this air cylinder carries a bracket 43 which is pivotally mounted by means of a pin 44 on a bracket 45 having a plate 46 secured by means of screws 46a to the under surface of the table 26. This arrangement is such that in the operation of the piston the air cylinder 42 may swivel to the extent required about the pin 44.

To operate the piston 41a and piston rod 41 in opposite directions, air under suitable pressure may be delivered to one end or the other of the cylinder 42 depending upon the direction of movement desired. For this purpose on air line 47 (Fig. 3) from any suitable high pressure source is provided with a T-fitting 48 from which extends a tube or pipe 49 connected with a valve 50. The latter may be operated in either direction from its normal position by means of a lever 51. When operated in one direction it serves to connect the line 49 with an air line 52 extending to the forward end of the cylinder 42. When the valve 50 is operated in the opposite direction the line 49 is connected with a line 53 extending to the opposite end of the cylinder 42. The arrangement is such that when air is delivered through line 52, air is exhausted from the opposite end of the cylinder through line 53 and an exhaust outlet 54 of the valve 50. Similarly when air under pressure is delivered through the line 53, air may be exhausted from the opposite end of the cylinder through line 52 and exhaust outlet 54. When the piston rod 41 is retracted into the full line position indicated in Fig. 4 by the introduction of air into the cylinder 42 through the line 52, the top half of the mold will be swung downwardly into closed position. Upon admission of air through the line 53 to the opposite end of the cylinder, the piston rod will be moved outwardly and will shift the arm 36 into the broken line position 36' indicated in Fig. 4, at which time the top half of the mold will assume the broken line position indicated at 28'.

For the purpose of stretching the section of tubing within the mold, a special clamp 55 (Figs. 8 to 11) is provided. This clamp is of generally cylindrical contour and is formed by two section 56 and 57. These are pivotally interconnected by means of a pin 58. The latter passes through an opening in an upstanding plate 59 suitably secured to the bottom member 56 of the clamp. The plate may, for example, be inserted in a suitable opening 59a in member 56 and may be welded or otherwise secured thereto. Pin 58 extends into openings provided in the top member 57 of the clamp and it may be secured against axial movement by means of a set screw 60 carried by member 57. A vertically extending passage in member 57 accommodates the plate 59 and is of sufficient dimension to permit rocking of member 57 about the axis of pin 58. The cylindrical portion of the clamp extending toward the left from the pivot pin 58 (Fig. 8) in effect provides a piston rod arranged for reciprocation through an opening in the end wall of the mold in alinement with the mold cavity. The cylindrical contour of the clamp may, if desired, conform rather closely with the tube forming cavity of the mold or it may be substantially smaller and have a relatively large clearance in relation to said cavity. When such extra clearance is provided the mold sections are preferably provided with hardened inserts 28a and 29a to provide a good wear resistant bearing for the clamp. The neck forming end of the mold sections is similarly provided with hardened inserts 28b and 29b.

The inner end of the clamp may suitably be tapered as shown in the drawings, and it is provided with a recess formed by complementary cut-out portions 61 and 62 provided in the two members of the clamp. This recess preferably has its surfaces serrated or otherwise provided with projections and grooves to grip the end of the tube section more firmly. When the jaw members are in the position shown in Fig. 9, the inner end of the tube section may be readily passed into the openings 61, 62 and the jaw members may then be rocked into the closed position of Fig. 8. The opposed faces of the jaw members at the right (Fig. 8) of the pivot 58 are spaced from each other as indicated at 63 and 64 to enable the pivotal movement of the top member 57 in relation to the bottom member 56. Means are provided for locking the two members against such pivotal movement when the jaws of the clamp have been firmly engaged upon the inner end of the section of tubing. For this purpose member 57 is provided with a pair of rearwardly extending projections 65 which carry a pivot pin 66 on which is mounted a lever 67. The latter has a curved camming face 68 arranged to cooperate with the surface 63 of member 56. When the lever 67 is in the position shown in Fig. 8 the two members 56 and 57 will be firmly retained in their clamping position. However, when the lever 67 is shifted to the position shown in Fig. 9, member 57 may be rocked to open the clamp as shown. Member 56 has a rearward extension 69 provided with a vertical opening 70 arranged to be engaged upon a pin 71 carried by a piston rod 72 of an air cylinder 73 (Fig. 3). Within the air cylinder the rod 72 carries a piston 72a arranged to be shifted in one direction or the other by air delivered to the cylinder. For the delivery of air under suitable pressure to the cylinder 73 a T-fitting 74 in the air line 47 is connected by a pipe 75 with a valve 76. The latter is arranged to be operated in either direction by means of a lever 77. When operated in one direction the valve serves to connect pipe 75 with a line 78 which serves to deliver the high pressure air to the left end of the cylinder 73 (Fig. 3). At the same time air in the cylinder at the opposite side of the piston 72a is discharged through a line 79 and an exhaust outlet 80 in the valve 76 to the atmosphere. Upon movement of the lever 77 in the opposite direction, air under pressure is delivered from pipe 75 to line 79 to cause movement of the piston toward the left (Fig. 3), at which time air in the left portion of the cylinder may be exhausted into the atmosphere through line 78 and outlet 80.

Figure 7:
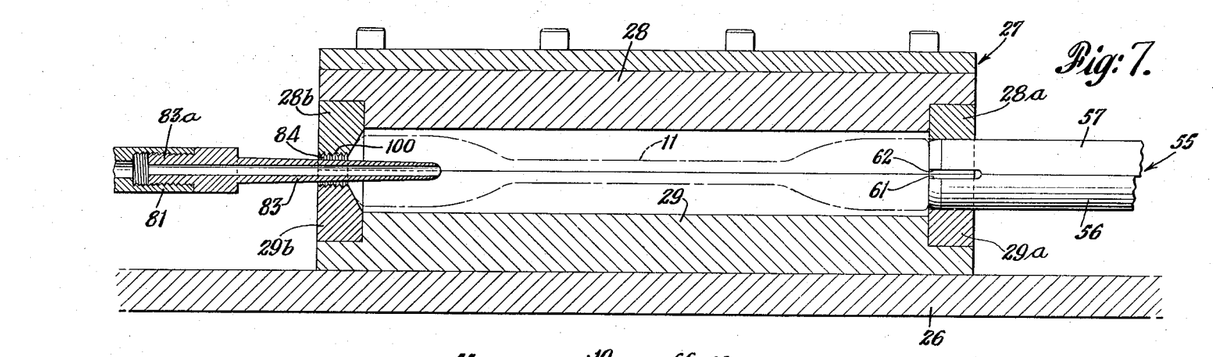
Fig. 7 is a detail view, in vertical section, through the mold cavity, showing a clamping member used in stretching the tubing and the nozzle for blowing the tubing, which is indicated in partially blown condition.

For the purpose of expanding the section of tubing circumferentially into conformity with the mold cavity, after it has been stretched by means of the clamping member 55, a mandrel or nozzle element 81 is provided. This has a longitudinal bore or passage and is mounted for longitudinal reciprocation in a bearing 82 carried by the table 26. At its inner end the mandrel is tapered as indicated at 83. The tapered portion of the mandrel may, if desired, be formed as a separate section, having a screw threaded extension 83a fitted into the end of the cylindrical body portion of the mandrel, as indicated in Fig. 7. This tapered section is adapted to be inserted into the mold through an opening 84 at the neck end of the mold, upon the longitudinal movement of the member 81. For the purpose of shifting the member 81 longitudinally, a lever 85 is provided (Fig. 3), this being pivotally secured to the table 26 by means of a bolt 86. A block 87 carried by the mandrel 81 has an opening or slot 87a therein cooperating within the lever 85. To prevent binding between the block 87 and lever 85 the latter is provided with cylindrical projections 85a arranged to cooperate with the side walls of the slot 87a. Means may, if desired, be provided for retaining the lever 85 in the position in which the nozzle element 83 is retracted from the mold. For this purpose a latch member 88 may be pivoted on a pin 88a carried by the lever 85. A finger 89 extending from the latch member is arranged to cooperate with a pin 90 carried by the table 26 when the lever 85 is shifted to the broken line position 85'. A spring 88b coacting between the latch 88 and lever 85 serves to retain the latch in active position. When it is desired to shift the lever toward the right (Fig. 3) the latch 88 may be squeezed to disengage the finger 89 from the pin 90.

At the appropriate time, air may be delivered through the nozzle member 83 under suitable pressure. For this purpose a T-fitting 91 in the air pressure line 47 is connected by pipe 92 with an adjustable pressure reducing valve 93 having a handwheel or other suitable control means for regulating the pressure drop through the valve to a line 94. A branch line extending from the line 94 may be connected with a gauge 96 to indicate the pressure in the line 94. At its opposite end the line 94 is connected with a valve 97 having an operating lever 98 and having its discharge side connected by a flexible conduit 99 with the outer end of the nozzle member 81. Upon operation of the lever 98 air under the desired pressure is delivered through the nozzle member into the clamped and stretched section of tubing within the mold.

A typical operation of the foregoing apparatus in carrying out the improved method for the production of collapsible tubes of the character commonly employed for the packaging of toothpaste will now be described. Tubing having an outside diameter of approximately .400" and an inside diameter of approximately .290" may be extruded by means of the extruder 10 from a suitable plastic material which may be a polymer of vinylidene chloride or a copolymer of vinylidene chloride and some other plastic such as vinyl chloride, vinyl acetate, styrene and the like. If a copolymer is employed, the vinylidene chloride should predominate sufficiently to impart a crystalline character to the copolymer at the appropriate time in the process and in the final product. It will be understood that appropriate amounts of other constituents, such as a suitable plasticizer, suitable pigmenting substances, and the like, may be incorporated in the material. The pigmenting substances may, for example, be applied after the tubing material has been extruded, in accordance with the disclosure of the patent to Alden W. Hanson, No. 2,251,486, granted August 5, 1941. Within the extruder, or in advance thereof, the material is heated to or somewhat above its softening temperature, i.e. to about 171° C., at which it is in the amorphous state.

In the course of cooling the tubing and storing the same, it will be found that it tends to shrink somewhat, so that its original wall thickness of .055" will become about .047" to .052". In this connection it may be mentioned also that the final container has a tendency to shrink slightly and therefore appropriate allowance should be made for this in the size of the mold employed.

Figures 8, 9:
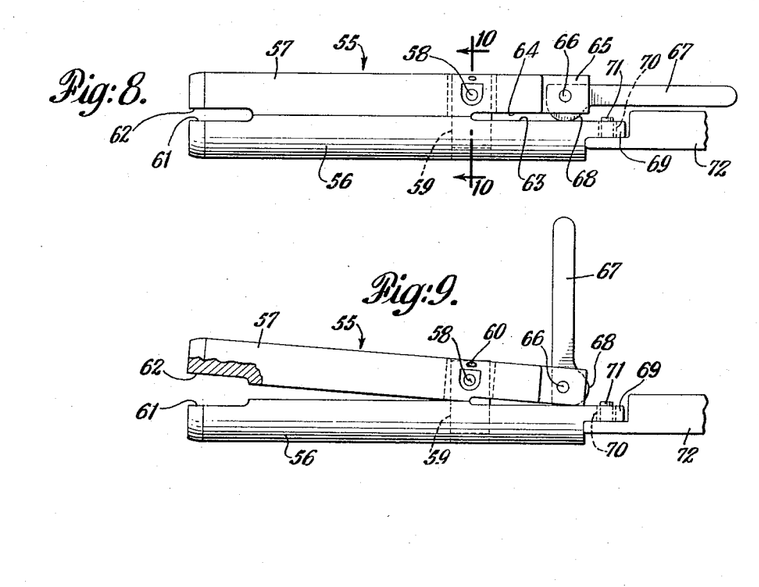
Fig. 8 is an elevational view of the clamping member shown in Fig. 7 with the parts shown in closed position and attached to the end of a reciprocatory rod.
Fig. 9 is a view similar to Fig. 8, but showing the parts in open position.
Figure 10:
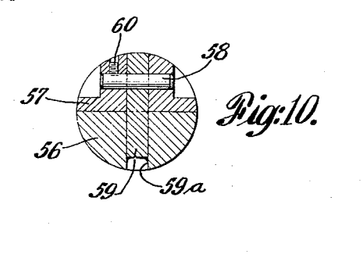
Fig. 10 is a sectional view through the clamping member, taken along the line 10—10 of Fig. 8.
Figure 11:
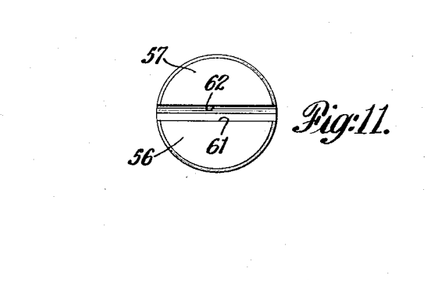
Fig. 11 is an end view of the clamp as seen from the left in Fig. 8.

The tubing formed by the extruder is quickly cooled by the spray 12 and within the tank 13 to a temperature of about 5° C. A section of this tubing may be severed from the main body of tubing and inserted in the mold 27, which at this time will be in its open position by appropriate operation of the valve 50. The section so inserted may have, for example, a length of 3¼". As indicated in Fig. 7, the neck end of the mold is provided with a threaded formation 100 in which the outer end of the section of tubing will be seated. The clamp 55 may at this time be moved to its innermost position within the mold by appropriate operation of the valve 76 and should be in its open position as shown in Fig. 9 so as to permit it to receive readily the inner end of the tubing. The mold may then be closed and clamped firmly about the end of the tubing by operation of the lever 67. If desired, the application of the clamp to the inner end of the tube may be performed prior to the introduction of the section of tubing into the mold. The clamp may, in this event, be removed from the end of the piston rod 72 by simply disengaging the end 69 from the pin 71. After the end of the tube has been firmly gripped and sealed the clamp may be applied to the pin 71 and the outer end of the tube simultaneously placed in the threaded neck portion 100 of the bottom section of the mold. At this time lever 51 may be shifted in the opposite direction to cause air under pressure to be supplied through pipe 52 to the cylinder 42 and thus bring about closing of the mold. In the course of such closing the threaded formation 100 in the top section of the mold will grip the outer end of the tube section. Lever 85 may now be operated to force the tapered end of the nozzle member 83 into the interior of the section of tubing through the opening 84 in the mold and upon such movement will squeeze the plastic material into the threaded formation 100. This will serve to provide a strong grip upon the tubing at the neck end of the mold. Valve 76 is then operated by appropriate movement of the lever 77 to introduce air under pressure through line 78 into the cylinder 73, thus causing retraction of the piston rod 72 and outward movement of the clamp 55, thereby stretching the section of tubing to the extent desired. In the example given the tubing may suitably be stretched to a length of about 6½ in. Valve 97 may now be opened by operation of lever 98 to cause air under pressure to be blown into the interior of the tube section, which, as will be understood, is effectively sealed at its inner end by the clamp 55 so that the air introduced under a gauge pressure of, say, about 60 lbs./sq. in. will expand the stretched tube section into conformity with the cavity of the mold. Preferably the application of the air pressure within the tube section is continued for a brief period, after it has been blown against the wall of the mold cavity, to allow the material of the tube to become permanently set. In order to reduce this setting time as far as possible, the mold 27 is preferably heated in any suitable way to a temperature between about 50° C. and 60° C. or somewhat higher. If the table 26 is formed of metal and the mold 27 is likewise of metal and applied directly to the top of the table the heat may be transmitted from the latter to the mold. Under the conditions mentioned it has been found that collapsible tubes may be made by the procedure indicated at the rate of about five per minute. This allows a setting time within the mold of about 7 seconds per tube.

In forming a collapsible tube having a desired outside diameter of 1 inch, it has been found that the mold cavity should have a diameter of about 1.020 in. to allow for the subsequent shrinkage. Upon completion of the setting operation, the mold may be opened by appropriate movement of the lever 51 and the finished tube may be removed and the operation repeated.

As indicated hereinabove, some variation in wall thickness of the finished tube has been noted but this is substantially less than the percentage variation in wall thickness of tubes formed merely by blowing a section of tubing to expand it circumferentially without stretching it longitudinally and substantially less than tubes expanded both longitudinally and laterally by blowing alone. The average wall thickness of the blown tube in the example given has been found to be about .0085 in.

It will be understood that the tubes resulting from the procedure described above will be closed at their bottoms and will have a projecting fin formed by the material gripped by the jaws of the clamp. In using these containers a suitable portion of the closed bottom will be cut off in any suitable way to provide the opening through which the tube will subsequently be filled. Prior to filling, a screw threaded cap will be applied to the threaded neck formed by the neck portion of the mold. The wall thickness of this neck portion of the tube will be substantially that of the original extruded tubing so that a relatively rigid and strong neck will be provided.

In lieu of manual operation of the several levers 51, 77, 85 and 98, these may be automatically operated, if desired, by any appropriate means. The operation may be fully automatic or semi-automatic to perform one step of the operation at a time after the operator has inserted a section of tubing in the bottom half of the open mold.

In Figs. 12 to 18 inclusive there are shown certain modified elements of the apparatus which may be employed for the production of plastic bottles in lieu of collapsible tubes. In general the apparatus may be of the same character as that described above. However, the mold and also the clamping means for stretching the original section of tubing are modified somewhat to bring about the desired result.

Figure 14:
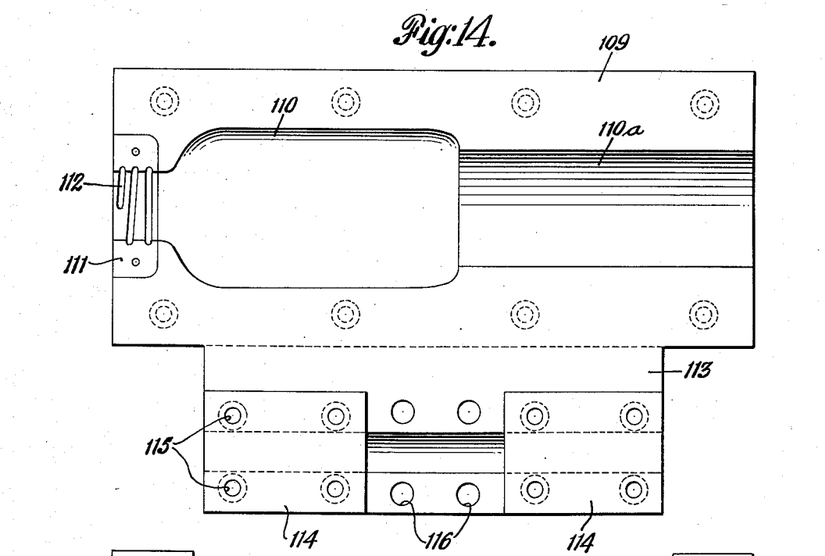
Fig. 14 is a plan view of the under face of the top half of the modified form of mold shown in Fig. 13.
Figure 15:
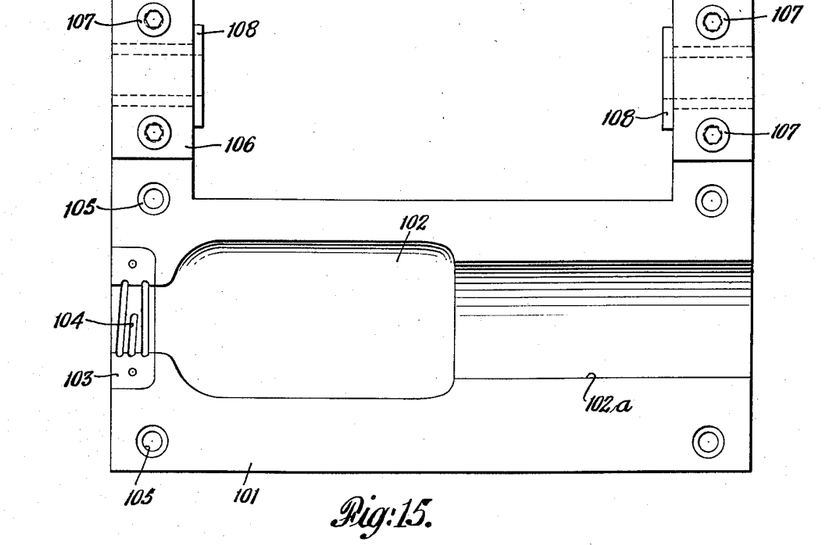
Fig. 15 is a plan view of the bottom half of the mold complementary to the top half shown in Fig. 14.

Referring to Figs. 14 and 15, there is shown the form of suitable top and bottom sections of a mold for plastic bottles. The bottom section (Fig. 15) comprises a main body portion 101, having a cavity 102 conforming with half of the contour of the desired bottle. As an extension of the cavity 102 there is a semi-circular depression 102a which is adapted to receive the clamping means similar to clamp 55 of Fig. 8. However, since none of the bottom of the finished bottle is to be removed with the exception of the fin formed by the pinching action of the clamp, it is desirable that the latter have a relatively close sliding fit within the cavity formed by depression 102a and a corresponding depression in the top section of the mold. At the opposite end of the bottle forming cavity 102 there is provided a special insert 103 which is replaceable. This is adapted to form the neck portion of the bottle and is provided with threaded formations 104. It may readily be replaced by a different block to provide a different thread formation whenever desired. Mold section 101 may be secured to the top of the table 26 by means of screws cooperating with holes 105 in the mold. At each end of the mold a rearwardly extending arm provides the lower portion of a suitable bearing for a shaft, similar to the shaft 30 of Fig. 3. A cap member 106 applied to each of these arms and secured thereto by screws 107 serves to complete the bearing. Preferably a bushing 108 is provided within each of the bearing arms.

The top section of the mold, shown in Fig. 14, comprises a main body portion 109 having a cavity 110 adapted to form the top half of the bottle. Alined axially with this is a semicircular depression 110a, which, together with the corresponding depression in the bottom member of the mold, provides a cylindrical chamber for the movement of the clamp. A block 111 complementary to the block 103 of Fig. 10 serves to complete the neck forming portion of the mold. It is provided with screw threaded formations 112. A rearwardly extending portion 113 of the top mold section carries a pair of spaced bearing caps 114 which are secured to the mold section by screws 115. Spaced bearings are thus provided for the shaft about which the two mold sections pivot in relation to each other. Openings 116 provided through the extension 113 between the bearing caps 114 provide for the attachment to the top mold section of an operating arm similar to the arm 36 of Fig. 4.

The clamping means by which the tube section is stretched prior to blowing, is shown in Figs. 12 and 16 to 18 inclusive. It may be of substantially the same construction as the clamp 55 of the embodiment first described. A top clamp member 117 and a bottom member 118 are arranged for pivotal movement about a pin 119 carried by a plate 120 welded or otherwise secured to the member 118. This plate extends upwardly through an opening in the top clamp member 117 with sufficient clearance to permit relative rocking of the two members.

Figure 12:
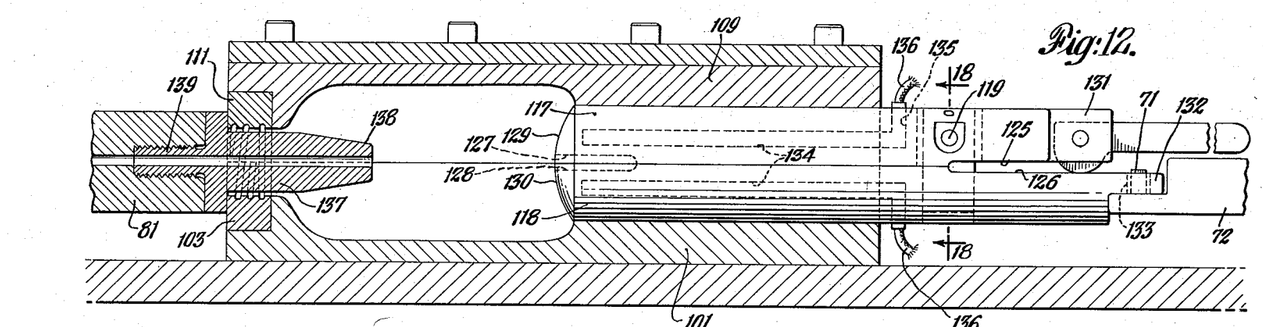
Fig. 12 is a view similar to Fig. 7 showing a modified construction.
Figures 13, 16, 17, 18:
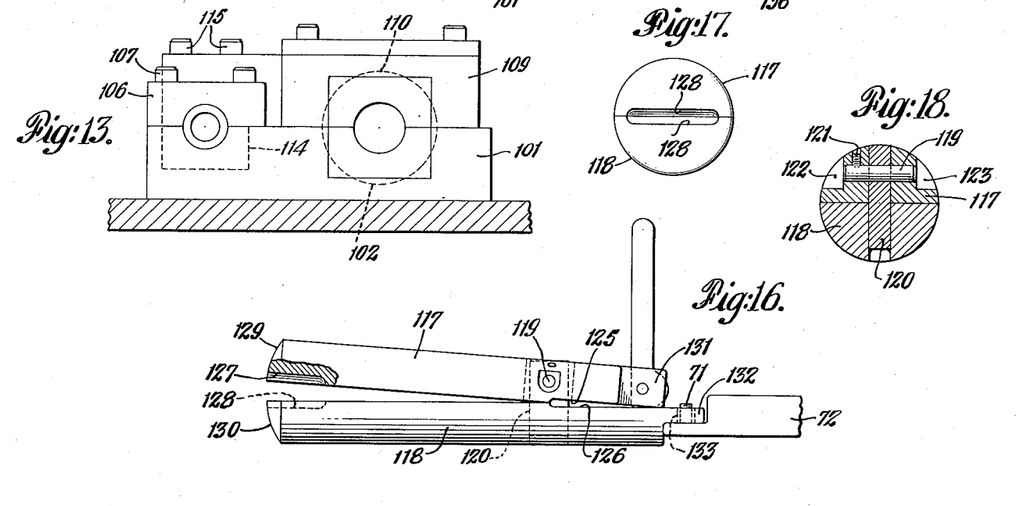
Fig. 13 is an end view of the mold of Fig. 12, as seen from the left.
Fig. 16 is an elevational view, similar to Fig. 9, showing a modified form of clamp used in connection with the mold of Figs. 12 to 15 inclusive.
Fig. 17 is an end view of the clamp of Fig. 16 as viewed from the left end of the latter.
Fig. 18 is a cross-sectional view through the clamp taken along the line 18—18 of Fig. 16.

Pin 119 may be secured against axial movement in the member 117 by means of a set screw 121. Adjacent the ends of the pin 119 the wall of the member 117 may be recessed as indicated at 122 and 123. To the right of the pivot pin 119 (Fig. 12) the adjacent faces of members 117 and 118 are cut away as indicated at 125 and 126 to permit the desired rocking movement of the clamp members. At their gripping ends the clamp members are provided respectively with recesses 127 and 128 which are preferably serrated or otherwise roughened to afford a good grip on the section of tubing. The adjacent ends of the members 117 and 118 are preferably of spherical configuration as indicated at 129 and 130 respectively, so that the bottle which is formed upon the blowing of the tube section will have a corresponding spherical indentation at its bottom. A small flap or tab will be formed at the center of this spherical indentation by virtue of the portion of the tubing which is gripped by the jaws 127, 128. This tab may be removed by shearing or the like upon removal of the bottle from the mold. Spaced extensions 131 on the member 117 provide for the pivotal support between them of a locking lever similar to the lever 67 of Figs. 8 and 9. This, cooperating with the surface 126 of member 118, will serve to lock the jaws in clamping position. Member 118 has an extension 132 provided with an opening 133 adapted to be applied over the pin 71 of piston 72 (Fig. 16).

If desired, means may be provided for heating the clamping means to facilitate forming a good seal at the bottom of the bottle as the end of the tube section is pinched together. For this purpose the member 118 may be provided with a recess 134 adapted to receive an electric heater of either the resistance element type or the electronic type. A passage 135 extending outwardly from the recess 134 provides for the introduction of a cable 136.

In the use of the apparatus for the production of bottles, it is preferable also to provide a somewhat shorter nozzle member on the line employed for expanding the tube section. A suitable form of nozzle is shown in Fig. 12. It has a main body portion 137 and a tapered extension 138 adapted to be inserted into the neck portion of the mold in the manner explained in connection with nozzle 83. At its opposite end the nozzle may have a screw threaded stem 139 by which it may be applied to the hollow rod 81.

It will be understood that in other respects the apparatus employed for the formation of plastic bottles may be substantially the same as described above in relation to the collapsible tube forming apparatus. The procedure followed is also substantially the same. Some variation may be required in the temperature, pressure and time factors involved. The tubing employed for the production of the bottles will normally be of somewhat larger diameter than that for collapsible tubes, and its wall thickness may be somewhat greater. This may necessitate a somewhat higher blowing pressure through the nozzle. Regulator 93 may be adjusted for this purpose to provide the required pressure. Under some circumstances it may be necessary or desirable to apply a pressure of as much as 150 lbs./sq. in. or even higher in expanding the tube to conform with the mold. In other instances in which very thin walled containers are desired and in which the original extruded tubing is relatively thin walled, a comparatively low pressure may be desirable. This may be as low as 10 lbs./sq. in. gauge.

To speed up the setting time of the plastic material of which the tube or container is formed and to insure uniform heating of the wall of the container, the air introduced to expand the section of tubing into conformity with the mold cavity may be heated, thus heating the plastic material from the inside as well as from the outside. Also, the nozzle used to introduce the blowing air may be heated, as by the inclusion of one or more electrical heating elements in the body of the nozzle, to heat the wall of the neck of the container from the inside.

While several illustrative embodiments of the invention have been disclosed in considerable detail and various modifications have been suggested, it should be understood that other changes may be made within the purview of the appended claims.

What is claimed is:

1. A method of making a hollow plastic article from tubing of crystallizable thermoplastic material which comprises initially stretching the tubing longitudinally only, thereafter expanding the stretched tubing circumferentially into conformity with a surrounding mold having the form of the desired hollow body, and causing the material of the tubing to crystallize and set in its condition of increased length and expanded diameter.

2. A method of making a hollow body from a section of tubing of an uncrystallized but normally crystalline polymerized substance, which comprises gripping one end of the tube section and thereby effectively sealing the same, gripping the opposite end of said tube section about a hollow member, suddenly stretching said tube section lengthwise intermediate its gripped ends, and promptly thereafter introducing a fluid under pressure through said hollow member into the interior of said tube section to expand the same into conformity with a surrounding mold.

3. Apparatus for making hollow articles from tubing sections which comprises clamping means for pinching one end of a tube section to grip the same and effect a seal at said end, a mold adapted to receive said tube section and movably receiving a portion of said clamping means, said mold being divided into a plurality of sections extending longitudinally of said tube section and having a cavity therein of the contour of the desired article, means for shifting said mold sections relative to each other to open and close the mold, means for operating said shifting means to close the mold after said tube section has been inserted therein, means on said mold for gripping the opposite end of said tube section about its periphery upon closing of said mold, said gripping means on said mold having a gripping surface of screw thread formation, a hollow mandrel having a tapered outer end, means for shifting said mandrel to insert the same in said opposite end of the tube section, the tapered portion of said mandrel serving to squeeze the portion of said tube section gripped by said mold into said thread formation, means for shifting said clamping means to cause lengthwise stretching of the tube section within the mold, and means for subsequently introducing a fluid under pressure into said tube section through said mandrel to expand said section into conformity with the mold cavity.

4. Apparatus for making hollow articles from tubing sections which comprises clamping means for pinching one end of a tube section to grip the same and effect a seal at said end, means for heating said clamping means, a mold adapted to receive said tube section and movably receiving a portion of said clamping means, said mold having a cavity therein of the contour of the desired article, means on said mold for gripping the opposite end of said tube section about its periphery, a hollow mandrel, means for shifting said mandrel to insert the same in said opposite end of the tube section, means for shifting said clamping means to cause lengthwise stretching of the tube section within the mold, and means for subsequently introducing a fluid under pressure into said tube section through said mandrel to expand said section into conformity with the mold cavity.

5. A method of making a hollow body from a tube section of an uncrystallized but normally crystalline polymerized substance the major portion of which is derived from vinylidene chloride, which comprises holding said tube section at a temperature between 10° C. and 60° C., gripping one end of the tube section and effectively sealing the same, gripping the opposite end of said tube section about a hollow member, heating said hollow member to thereby heat said gripped opposite end of said tube section from the interior thereof, suddenly stretching said section lengthwise while so gripped, promptly thereafter introducing a fluid under pressure through said hollow member into the interior of said section to expand the same into conformity with a surrounding mold, and maintaining the resulting hollow body in expanded condition at a temperature and for a time sufficient to impart a permanent set by crystallization of said substance.

6. A method of making a hollow body from a section of tubing formed of thermoplastic material which tends to crystallize and lose its plasticity at and above normal room temperature which comprises retaining said section of tubing at a temperature below normal room temperature until it is to be formed into said hollow body, heating said section of tubing to at least normal room temperature, successively increasing the length of said section of tubing and then expanding the tubing circumferentially into conformity with a surrounding mold having the form of the desired hollow body before substantial crystallization of the material can occur, and maintaining said tube section in said form at at least said normal room temperature for a sufficient time to cause the material to crystallize and remain set in said form.

7. Apparatus for making hollow articles from tubing formed of plastic material which comprises clamping means for pinching one end of a section of tubing to grip the same and effect a seal at said end, a mold adapted to receive said tube section and movably receiving a portion of said clamping means, said mold having a cavity therein of the contour of the desired article, means on said mold for gripping the opposite end of said tube section about its periphery, a hollow mandrel, means for shifting said mandrel to insert the same in said opposite end of the tube section and assist in gripping said end, means for shifting said clamping means to cause lengthwise stretching of the section of tubing within the mold, and means for subsequently introducing a fluid under pressure into said tube section through said mandrel to expand said section into conformity with the mold cavity.

8. Apparatus for making hollow articles from tubing formed of plastic material which comprises clamping means for pinching one end of a section of tubing to grip the same and effect a seal at said end, a mold adapted to receive said tube section and movably receiving a portion of said clamping means, said mold being divided into a plurality of sections extending longitudinally of said tube section and said mold having a cavity therein of the contour of the desired article, bearing means at one end of said mold cooperating with said clamping means for supporting and guiding the same for endwise movement within said mold, means on said mold for gripping the opposite end of said tube section about its periphery, a hollow mandrel, means for shifting said mandrel to insert the same in said opposite end of the tube section and assist in gripping said end, means for shifting said clamping means to cause lengthwise stretching of the section of tubing within the mold, and means for subsequently introducing a fluid under pressure into said tube section through said mandrel to expand said section into conformity with the mold cavity.

References Cited in the file of this patent

UNITED STATES PATENTS

| | | |
|---|---|---|
| 2,230,190 | Ferngren | Jan. 28, 1941 |
| 2,322,213 | Amberg | June 22, 1943 |
| 2,331,688 | Hobson | Oct. 12, 1943 |
| 2,396,635 | Bogoslowsky | Mar. 19, 1946 |
| 2,452,080 | Stephenson | Oct. 26, 1948 |
| 2,503,171 | Posner | Apr. 4, 1950 |
| 2,515,093 | Mills | July 11, 1950 |
| 2,579,399 | Ruekberg | Dec. 18, 1951 |
| 2,634,459 | Irons | Apr. 14, 1953 |
| 2,792,593 | Hardgrove | May 21, 1957 |